United States Patent [19]

Ray, III et al.

[11] Patent Number: 4,499,550
[45] Date of Patent: Feb. 12, 1985

[54] WALSH FUNCTION MIXER AND TONE DETECTOR

[75] Inventors: John M. Ray, III, North Lauderdale, Fla.; Robert J. Martin, Lynchburg, Va.

[73] Assignee: General Electric Company, Lynchburg, Va.

[21] Appl. No.: 430,390

[22] Filed: Sep. 30, 1982

[51] Int. Cl.³ .................. G06J 1/00; G06F 15/332
[52] U.S. Cl. .................. 364/606; 328/138; 364/484; 364/727; 364/851
[58] Field of Search .......... 364/481, 484, 721, 727, 364/841, 851, 602, 604, 606–608; 179/84 VF; 328/138, 160; 455/34, 35; 324/78 D, 78 R, 78 F, 79 R, 79 D; 307/522, 523

[56] References Cited

U.S. PATENT DOCUMENTS

| | | | |
|---|---|---|---|
| 4,021,653 | 5/1977 | Sharp et al. | 328/138 X |
| 4,047,009 | 9/1977 | Challen | 364/721 |
| 4,052,565 | 10/1977 | Baxter et al. | 364/727 X |
| 4,258,423 | 3/1981 | Lane et al. | 328/138 X |
| 4,333,150 | 6/1982 | Matty et al. | 364/484 |
| 4,334,273 | 6/1982 | Ikeda | 328/138 X |
| 4,363,100 | 12/1982 | Agnew et al. | 364/484 |

Primary Examiner—Joseph F. Ruggiero
Attorney, Agent, or Firm—Cushman, Darby & Cushman

[57] ABSTRACT

A mixer stage having particular application to digital detectors. The mixer stage includes first and second sets of transmission gates and a Walsh function generator. The first set of transmission gates is driven by sine function coefficient signals from the Walsh function generator so as to open and close individual gates of the set so as to effectively multiply an input signal by the sine of a tone reference frequency to be tone detected. Similarly, the second set of transmission gates is driven by cosine coefficient signals from the Walsh function generator so as to open and close individual gates of the second set to effectively multiply the input signal by the cosine of the reference frequency to be tone detected. To form a complete digital tone detector, the sine and cosine multiplied outputs of the mixer stage are each filtered and squared and are then summed and further filtered to provide a "detect" signal when the input signal includes the reference frequency.

26 Claims, 8 Drawing Figures

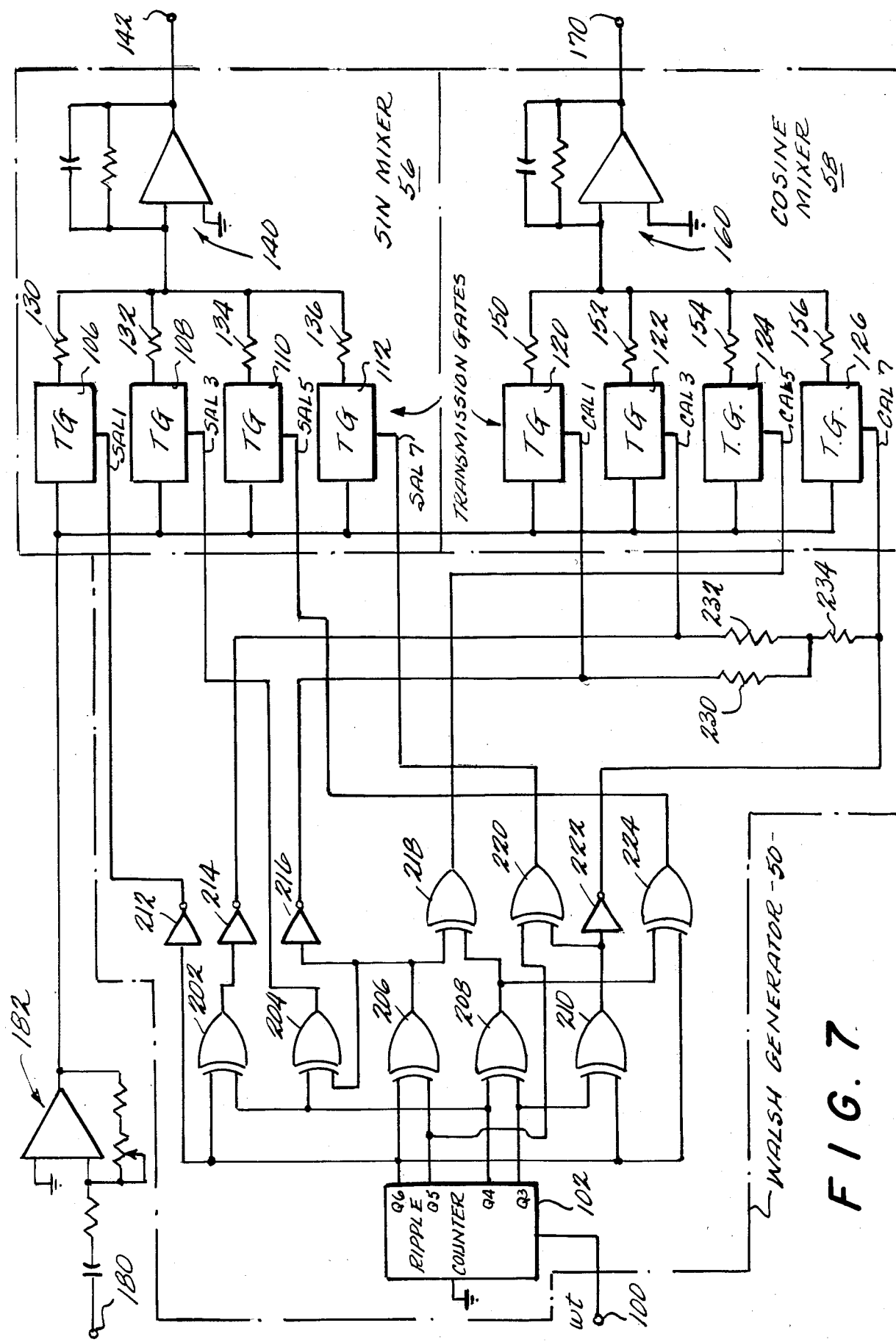

WALSH FUNCTION MIXER AND TONE DETECTOR

BACKGROUND OF THE INVENTION

This invention relates in general to tone detectors. More specifically, the invention relates to tone detectors such as, for example those of the type used in radio receivers to detect a particular tone modulated on a received carrier wave such as used in the addressing of paging radios and the like. More specifically, the invention provides a mixer stage for multiplying a received and carrier demodulated input signal by a reference frequency to determine whether there are any components of the reference frequency in the input signal.

Various known tone detector arrangements are shown in the following patents, the teachings of which are specifically incorporated herein by reference.
U.S. Pat. No. 4,275,271—Soulliard—June 23, 1981
U.S. Pat. No. 4,258,423—Lane, et al—Mar. 24, 1981
U.S. Pat. No. 4,142,177—Davis—Feb. 27, 1979
U.S. Pat. No. 4,047,114—Lane, et al.—Sept. 6, 1977
U.S. Pat. No. 4,021,653—Sharp et al.—May 3, 1977
U.S. Pat. No. 3,962,645—Stewart—June 8, 1976

The above list is intended only to be exemplary of the prior art related to tone detectors and is not intended to be an exhaustive list.

It is known to utilize a sine and/or cosine multiplied input signal to determine the presence or absence of a frequency component of a reference signal in the input signal. Specifically, sine and cosine mixers are used in digital tone detectors for detecting the presence or absence of a specific tone in a signal containing a large number of frequencies. There are many known methods for accomplishing this objective including the use of complex filtering arrangements.

Typically, an input signal to be tone detected is mixed with a pure sine wave signal of the tone frequency to be detected (also referred to as the "reference frequency"). The mixer, in effect, multiplies the input signal by the reference frequency to produce a DC component in the mixed (multiplied) output whenever a frequency component of the input signal is equal to the reference frequency to be detected. The mixer output is low pass filtered and subjected to the transfer function of a square law device to develop a signal proportional to the power of the mixed signal. A popular mixer used in this type of tone detector is a four-quadrant multiplier, such as for example an MC 1595L integrated circuit with appropriate offset adjustment networks. A problem with this known approach is that the tone detector is relatively complex and expensive.

This invention is directed to a mixer stage that can replace the known four-quadrant mixer in a tone detector and to the tone detector circuit including the mixer stage. In essence, a known mixer stage is replaced by a set of transmission gates driven by a Walsh function generator providing either sine or cosine Walsh function coefficient signals to the gates causing them to open and close. The gates effectively multiply an input signal to be tone detected by the sine or cosine function defined by the Walsh function coefficient signals.

A Walsh function generator works by logically breaking down an input signal such as for example a square wave or other signal with recognizable edges into a group of several periodic pulse trains known as Walsh functons. Certain ones of the Walsh functions may be combined in a Walsh weighting and summing network to form a stair-step sine wave. The sine wave frequency is directly related to the frequency of a square wave input to the Walsh function mixer. Similarly, a stair-step cosine wave can be constructed using the remaining Walsh functions. A Walsh weighting and summing network including properly valued resistors separately attenuate each of the Walsh functions to a desired level. These attenuated Walsh functions are then summed to create the desired wave form. In this particular circuit, the Walsh function outputs of the Walsh function generator are used to open and close individual gates of the transmission gates sets. The sine coefficient signals from the Walsh function generator are used to open and close the gates of the "sine" set of transmission gates and the cosine coefficient signals from the Walsh function generator are used to open and close the gates of the "cosine" set of transmission gates.

Walsh function generators per se are known and used in other applications. See for example the following documents, the contents of which are hereby incorporated by reference:
U.S. Pat. No. 4,052,565—Baxter et al (Oct. 4, 1977)
U.S. Pat. No. 4,047,009—Challen (Sept. 6, 1977)
"Walsh Functions: A Digital Fourier Series" by Benjamin Franklin Jacoby, Ph.D., Information Conversion Devices Co., 88 W. Frankfurt St., Columbus, OH 43206.

The Baxter '565 patent shows a Walsh function generator used in a digital speech scrambler. The Challen '009 patent teaches how to use a Walsh function generator in a digital tone generator for a radio controlled squelch system. The Jacoby article provides a discussion of the mathematical basis for synthesizing waveforms using Walsh functions.

SUMMARY OF THE INVENTION

The present invention provides a Walsh function mixer stage and a tone detector incorporating the Walsh function mixer stage for use in various types of electronic equipment such as, for example, radios. The tone detector is intended for use in determining the presence or absence of a specific tone frequency component in a received and carrier demodulated signal possibly containing a large number of frequencies.

An input signal such as a received and carrier demodulated radio signal to be tone detected is coupled to a first section (sine section) of the mixer stage including a sine mixer which multiples it with a sine wave of the desired tone frequency. The output of the mixer has a DC component whenever the reference is present in the input signal. The mixer output is coupled through a low pass filter to a square law device. A tone input of the desired frequency to the mixer will result in an output signal from the square law device. This output will be a function of the power of the input signal and the relative phase angle between the frequency component being detected and the reference signal mixed with the input signal being tone detected. It is possible that despite the presence of a component of the reference frequency in the input signal, the square law device may provide a "zero" output if the relative phase angle happens to be 90° or 270°.

Therefore, a second section (cosine section) of the mixer stage including a cosine mixer, low pass filter and square law device is provided. In this second section, the input signal is mixed with a cosine of the reference frequency rather than with the sine of the reference frequency. The outputs of the square law devices of the sine and cosine sections are summed to form the tone detector output.

Each of the sine and cosine mixers are formed by a set of transmission gates each having an input signal for receiving the signal to be tone detected. The transmission gates are driven to open and close by the output signals of a Walsh function generator for synthesizing a sine or cosine function. In essence, the Walsh function generator provides the sine and cosine terms of the reference frequency to be tone detected. These sine and cosine terms are used to effectively create a sine and cosine signal for multiplying the input signal. By using a Walsh function generator, the tone detector becomes digitally programmable and the multiplied signals are harmonically pure. It becomes easy to generate in-phase sine and cosine outputs of the reference frequency.

In essence, the present invention provides a mixer stage for multiplying an input signal by the sine and cosine of a reference frequency, comprising:

(a) input means for receiving the input signal;

(b) a first set of transmission gates, each gate having an input for receiving the input signal, an output and a control input for receiving a control signal for causing the gate to pass the input signal from the gate input to its output or block the input signal so that it does not pass to the output;

(c) first means associated with said first set of transmission gates for combining the signals at the outputs thereof into a first mixer section output providing a signal defined by the input signal multiplied by the sine of the reference frequency;

(d) first means associated with said first set of transmission gates for weighting the contributions of the signals from each transmission gate to said first combining means;

(e) a second set of transmission gates, each gate having an input for receiving the input signal, an output, and a control input for receiving a control signal causing the gate to pass the input signal from the gate input to its output or block the input signal so that it does not pass to the output;

(f) second means associated with the second set of transmission gates for combining signals at the respective outputs thereof into a second mixer section output providing a signal defined by the input signal multiplied by the cosine of the reference frequency;

(g) second means associated with the second set of transmission gates for weighting the contributions of the signals from each transmission gate to said second combining means;

(h) a reference frequency source;

(i) Walsh function generating means having an input coupled to said reference frequency source, a first set of outputs for providing signals representing a sine wave synthesis of reference frequency from Walsh function pulse trains, the first set of outputs being coupled to said control inputs of the first set of transmission gates, and a second set of outputs for providing signals representing a cosine synthesis of the reference frequency from Walsh function pulse trains, the second set of outputs being coupled to said control inputs of said second set of transmission gates.

The invention also provides a digital tone detector for determining the presence or absence of a predetermined reference frequency component in an input signal comprising:

input means for receiving said input signal;

a first Walsh function mixer having a signal input coupled to said input means, a set of control inputs and an output for providing an output signal defined by said input signal multiplied by the sine of said reference frequency;

a second Walsh function mixer having a signal input coupled to said input means, a set of control inputs and an output for providing an output signal defined by said input signal multiplied by the cosine of said reference frequency;

a reference frequency source;

a Walsh function generator having an input coupled to said reference frequency source for generating, at a first set of outputs, signals representing a sine wave synthesis of said reference frequency, said first set of outputs being coupled to said control inputs of said first Walsh function mixer and for generating, at a second set of outputs, signals representing a cosine wave synthesis of said reference frequency, said second set of outputs being coupled to said control inputs of said second Walsh function mixer;

a first low pass filter coupled to said output of said Walsh function mixer;

a first squaring circuit coupled to said first low pass filter;

a second low pass filter coupled to said output of said second Walsh function mixer;

a second squaring circuit coupled to said second low pass filter;

means for combining signals from said first and second squaring circuits to provide an output signal wherever a component of said reference frequency is present in said input signal.

BRIEF DESCRIPTION OF THE DRAWINGS

An exemplary embodiment of the present invention constituting the presently preferred best mode for carrying out the invention will be described in detail with respect to the drawings wherein:

FIG. 7 is a schematic diagram of the mixer sections shown in FIG. 6 and

DETAILED DESCRIPTION OF PREFERRED EMBODIMENT

Figure 1:
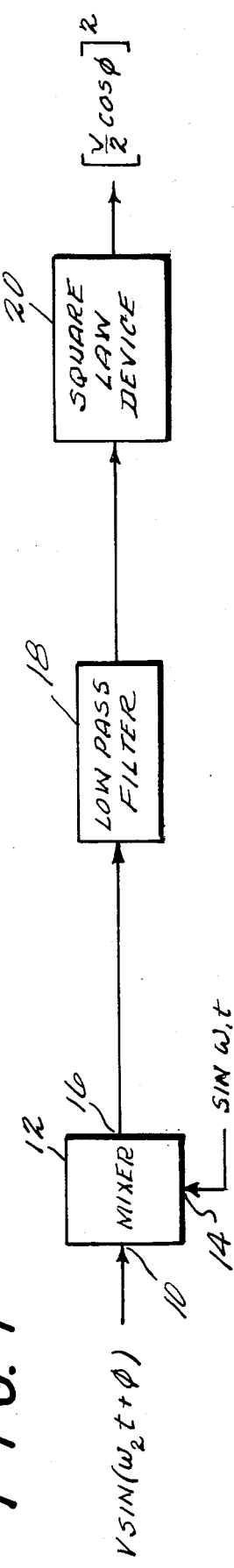
FIG. 1 is a block diagram of a sine mixer section of the mixer stage tone detector circuit according to the present invention.

Referring now to FIG. 1 there is shown in block diagram the operative portions of a first section (sine section) of the tone detector according to the present invention. An input signal desired to be tone detected is coupled to an input 10 of a mixer 12 for multiplying the input signal by a sine wave of the desired detection frequency applied at an input 14 of mixer 12. An output 16 of mixer 12 will include a d.c. component whenever the desired tone is present in the input signal. The output of mixer 12 is filtered by a low pass filter 18 and then coupled through a square law device 20 to produce a first section output signal.

Assume that the input signal to be tone detected includes a component defined by Equation (1) below and that the reference frequency to be tone detected is $w_1$ $$V \sin(w_2 t + \phi) \tag{1}$$

If the mixer is a linear multiplier for multiplying the input signal by SIN $w_1 t$, its output will be as shown in Equation (2) which can be mathematically manipulated to form Equation (3).

$$V \sin(w_2 t + \phi) \cdot \sin w_1 t \tag{2}$$

$$\frac{V}{2} \cos[(w_2 - w_1)t + \phi] - \frac{V}{2} \cos[w_2 + w_1)t + \phi] \tag{3}$$

If the frequency of the input signal is equal to that of the desired tone then $w_2 - w_1 = O$ and the first term of the mixer output becomes that shown in Equation (4), a d.c. value.

$$\frac{V}{2} \cos \phi \tag{4}$$

Low pass filter 18 coupled to the output of mixer 12 designed to pass only those frequencies which are at or slightly above d.c. Therefore, low pass filter 18 will provide an output only when $w_2$ is equal to or within a few radian/second of $w_1$.

Square law device 20 is coupled to the output of the low pass filter to obtain an output proportional to the power of the input signal. The detection of signal power rather than of signal level results in a positive output of the square law device. Thus, a tone input of the desired frequency (within a few radian/second) results in an output from the square law device equal to that shown in equation (5) below and a tone input of any other frequency results in an output of zero $$\left[\frac{V}{2} \cos \phi \right]^2 \tag{5}$$

The output of square law device 20 is a function of the relative phase angle $\phi$ of the input signal. Therefore, for certain values of $\phi$, the detector output could be zero even with the reference tone frequency is present at the input. Because of this effect, it is appropriate to add a second section to the detector as shown in FIG. 2.

Figure 2:
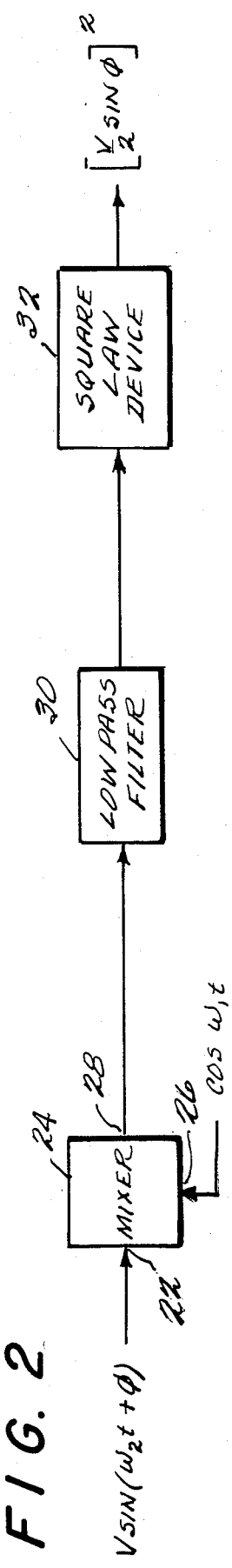
FIG. 2 is a cosine mixer section of the mixer stage and detector circuit according to the present invention.

Referring now to FIG. 2, the input signal represented by Equation (1) is coupled to an input 22 of a cosine mixer 24. In mixer 24, the input signal is multiplied by the cosine of the reference frequency coupled to an input 26 of mixer 24 to form a signal at an output 28 of the mixer represented by in Equation (6) below.

$$V \sin(w_2 t + \phi) \cdot \cos w_1 t \tag{6}$$

The output signal is filtered by a low pass filter 30 and then coupled through a square law device 32 in the same manner that the sine multiplied signal is processed as shown in FIG. 1. The output of square law device 32 in the cosine section would be defined by Equation (7) below.

$$\left[\frac{V}{2} \sin \phi \right]^2.$$

Figure 3:
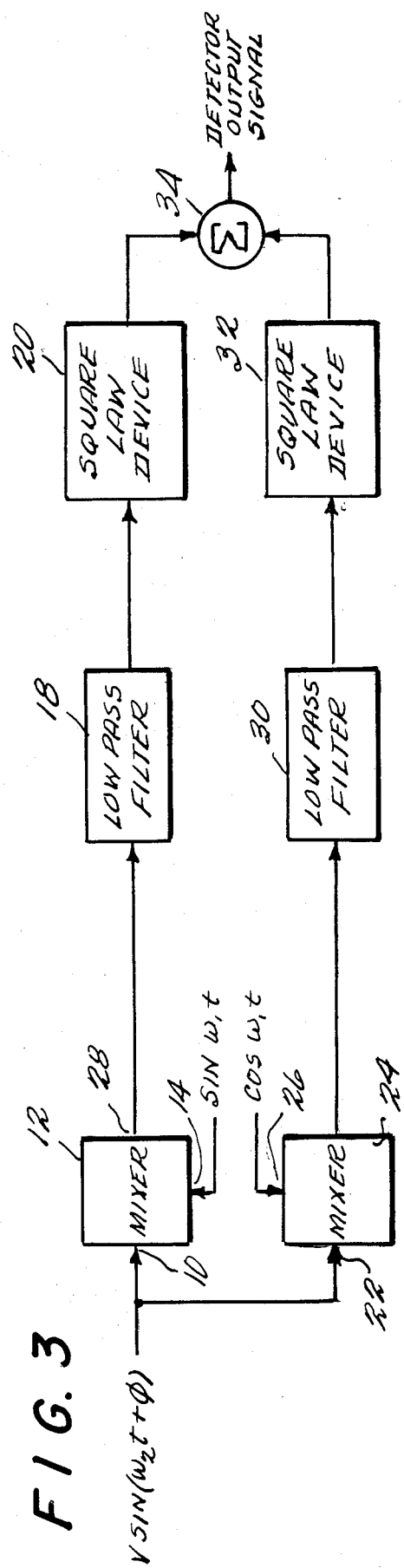
FIG. 3 is a block diagram of the complete tone detector circuit according to the present invention.

Referring now to FIG. 3 there is shown a block diagram of a complete tone detector including both the sine and cosine sections shown in FIGS. 1 and 2. As shown, the input signal is coupled to input 10 of mixer stage 12 and to input 22 of mixer stage 24. The outputs of square law devices 20 and 32 are summed by a summer 34 to form a tone detector output signal. The output of summer 34 can be represented by Equations (8) (9) and (10) below:

$$\frac{V^2}{4} \cos^2 \phi + \frac{V^2}{4} \sin^2 \phi = \tag{8}$$

$$\frac{V^2}{4} \cos \phi + \sin^2 \phi = \tag{9}$$

$$\frac{V^2}{4} = \tag{10}$$

The detector output signal $V^2/4$ is a DC value which may be used to indicate the presence of the desired tone in the input Thus far, mixers 12 and 24 are shown only as general blocks. No reference has been made to the particular method used to generate the sine and cosine terms of the reference frequency. The reference frequency could be generated by any number of known methods including crystals, phase locked loops or filtered square waves. However, applicants have recognized the advantage of utilizing a Walsh function generator for forming the sine and cosine component coupled to inputs 14 and 26 respectively of mixers 12 and 24.

Figure 4:
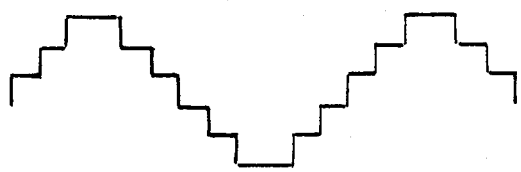
FIG. 4 is a graphical representation of a stairstepped sine wave synthesized by a Walsh function generator.

The Walsh function generator offers several advantages. First, the use of a Walsh function generator allows for digital programmability. Secondly, it provides a signal with low harmonic content in its output wave form and thirdly, it allows for an easy method for generating coherent sine and cosine outputs of the same frequency. A Walsh function generator works by logically breaking down an input square wave into a group of several periodic pulse trains known as Walsh functions. Certain ones of these Walsh functions may be combined in a Walsh weighting and summing network to form a stair-step sine wave as shown in FIG. 4. The sine wave frequency is directly related to the frequency of the input square wave. Similarly, a stair-step cosine wave may be constructed using the remaining Walsh functions.

Figure 5:
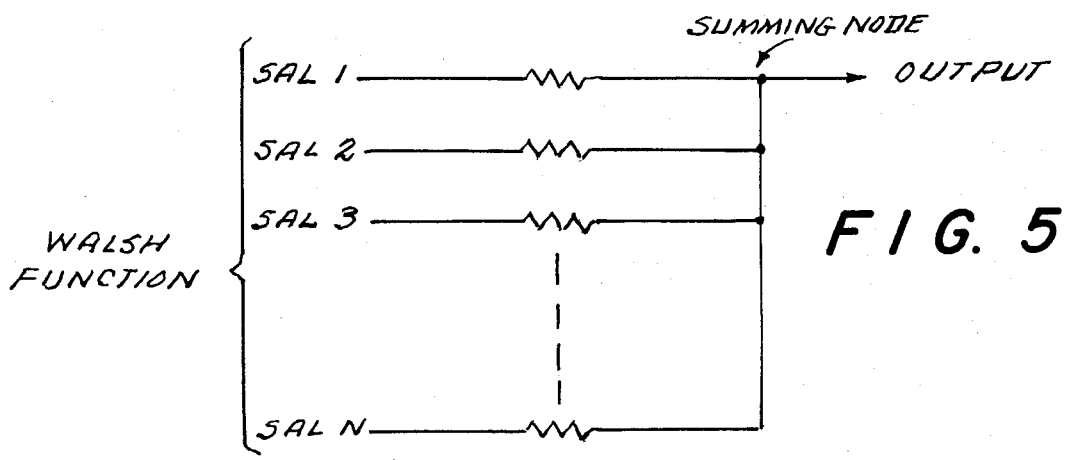
FIG. 5 is a Walsh weighting and summing network used to combine the Walsh function outputs to synthesize a sine wave.

Referring now to FIG. 5 there is shown a weighting and summing network. The weighting and summing network includes a plurality of appropriately valued resistors which separately attenuate each of the Walsh functions to a desired level and a summing node at which the properly weighted Walsh functions are combined to create the desired sine or cosine wave form. The summing network shown in FIG. 5 provides the sine stair-stepped wave shown in FIG. 4 by utilizing Walsh functions SAL 1 . . . SAL N. A true sine wave can be extracted from the stair-stepped sine wave using a low pass filter. The following description is related to the mixers 12 and 22.

Normally, mixers 12 and 22 would be implemented using four quadrant multipliers. However, as a substitute for four quadrant multipliers, each mixer is implemented by a group of transmission gates.

Figure 6:
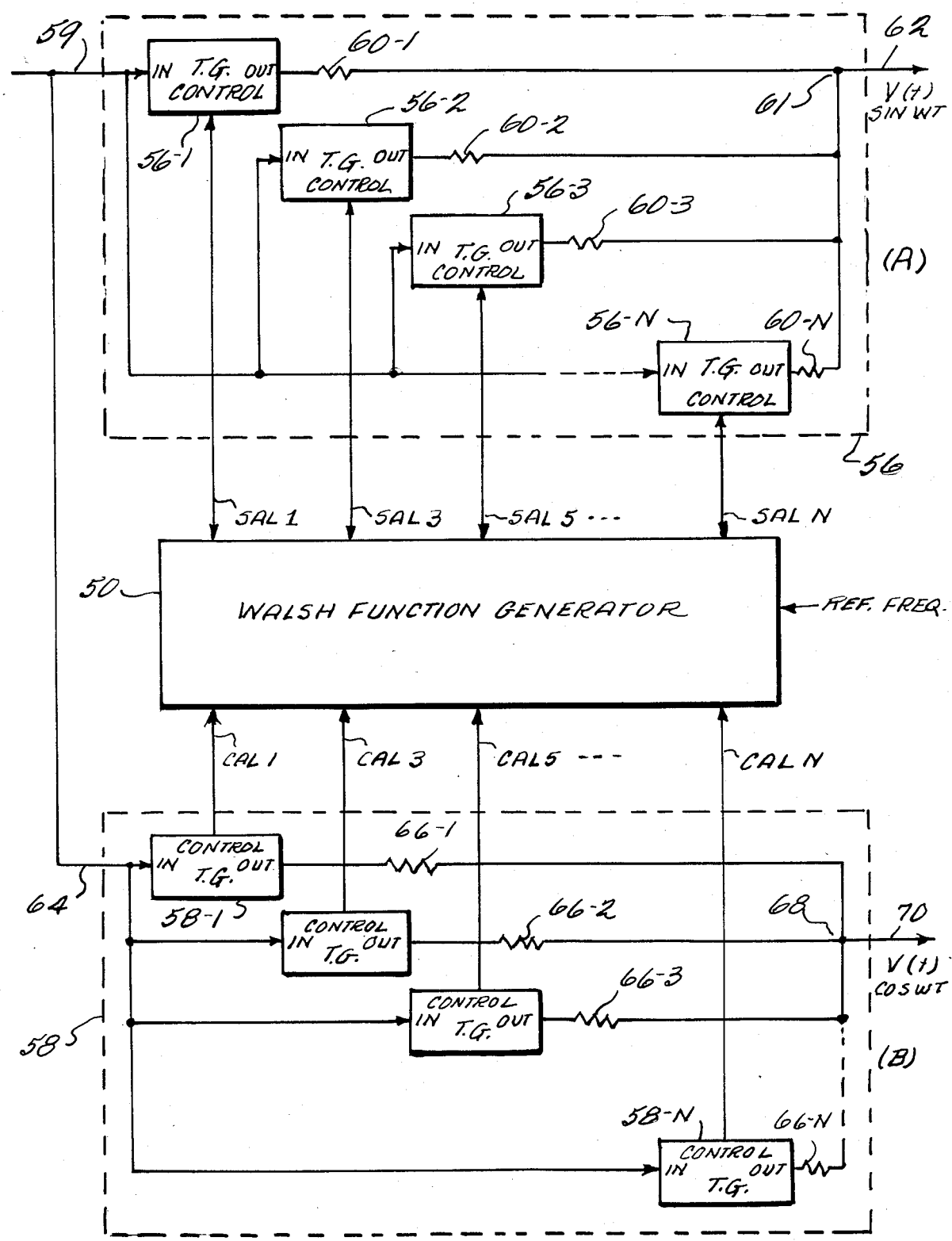
FIG. 6 is a block diagram of the sine and cosine mixer stages according to the present invention.

Referring now to FIG. 6 there is shown a mixer stage according to the present invention incorporating a Walsh function generator 50. Walsh function generator 50 generates at a first set of outputs sine Walsh functions SAL 1 . . . SAL N and at a second set of outputs cosine Walsh functions CAL 1 . . . CAL N. The input to Walsh function generator 50 is the reference frequency (REF. FREQ.) to be tone detected. The sine coefficient outputs of Walsh function generator 50 are coupled to control inputs of a first set of tranmission gates 56 including gates 56-1 . . . 56-N. In essence, input 59 of transmission gates set 56 corresponds to input 10 of mixer 12 shown in FIGS. 1 and 3. Each transmission gate 56-1 . . . 56-N includes an input coupled to input 59 of the set 56 of transmisson gates, a control signal input coupled to one of the sine coefficient signals from Walsh function generator 50 and an output. The outputs are combined by a resistor summing network including resistors 60-1 . . . 60-N. These resistors couple signals from their respective transmission gates to a common summing node 61 forming an output signal of the sine mixer section at an output 62 of transmission gate set 56. Resistors 60-1 . . . 60-N perform the same weighting function as the illustrative resistor summing network shown in FIG. 5 except that in FIG. 6, weighting occurs after multiplication in the mixer.

Similarly, the cosine coefficient signals CAL-1 . . . CAL-N from Walsh function generator 50 are coupled to the control inputs of individual transmission gates 58-1 . . . 58-N of transmission gate set 58. Each of transmission gates 58-1 . . . 58-N includes an input coupled to an input 64 of transmission gate set 58. Each transmission gate 58-1 . . . 58-N also includes an output coupled via a resistor 66-1 . . . 66-N, respectively to a common node 68 forming an output signal coupled to an output 70 of transmission set 58.

Referring now to FIG. 7 there is shown a schematic diagram of a specific circuit configuration of the mixer arrangement shown in general block form in FIG. 6. Dotted lines define the basic block elements as shown in FIG. 6 and use corresponding reference numerals for sine mixer 56, cosine mixer 58 and Walsh function generator 50.

Walsh function generator 50 receives a signal wt at an input 100 thereof. The signal is coupled to the clock input of a 12 stage ripple counter 102 preferably constituted by a 4040 integrated circuit. Ripple counter 102 includes Q3, Q4, Q5 and Q6 outputs providing divide by 8, divide by 16, divide by 32 and divide by 64 outputs, respectively. As an alternative, the outputs could be divide by 2, divide by 4, divide by 8 and divide by 16 or any successively declining power of 2. The ripple counter 102 outputs are coupled to the inputs of a logic circuit including gates 202–224 and a resistor network including resistors 230, 232 and 234 to provide the sine and cosine coefficient signals defining the sine and cosine Walsh functions. Gates 202, 204, 206, 208, 210, 218, 220 and 224, are preferably constituted by qaud packaged gates such as, for example 4030 gates. Of course, other types of logic circurts could also be used in place of gates, such as for example, relays. Gates 212, 214, 216 and 222 are preferably constituted by 4049 HEX inverter integrated circuits. It will be appreciated by those of ordinary skill in the art that one could choose to generate a different number of Walsh functions than as shown in the FIG. 7 embodiment. In this embodiment the Q3, Q4, Q5 and Q6 outputs of ripple counter are used but a different set of outputs could have been selected. The number of Walsh functions generated determines the relationship between the reference clock frequency and the frequency of the tone to be detected. For example, if five (5) Walsh functions were to be used, one would clock at $2_5$ times the tone frequency to be detected.

The sine coefficient signals are labeled SAL1, SAL3, SAL5 and SAL7. The cosine coefficient signals are labeled CAL1, CAL3, CAL5 and CAL7. The sine coefficient signals are coupled to the control inputs of transmission gates (T.G.) 106, 108, 110 and 112 of sine mixer 56. The cosine coefficient signals are coupled to the control input of transmission gates 120, 122, 124 and 126 of cosine mixer 58. The transmission gates are preferably constituted by CMOS quad-bilateral switches using 4066 integrated circuits. The outputs of transmission gates 106 . . . 112 of sine mixer 56 are summed with a resistor summing network including resistors 130, 132, 134 and 136. The summed output is coupled through an amplifier stage 140 to provide a sine multiplied output of sine mixer 56 at an output terminal 142 thereof.

Similarly, the outputs of transmission gates (T.G.) 120, 122, 124 and 126 in cosine mixer 58 are summed with a resistor summing network including resistors 150, 152 and 154 and 156. The combined outputs of the transmission gates are coupled through an amplifier stage 160 to provide a cosine multiplied output at an output terminal 170 of the mixer stage. The input signal to be mixed and tone detected is coupled to an input 180 of the mixer stage and is amplified by an amplifier stage 182 before it is coupled to the input of each of the transmission gates in the sine mixer 56 and cosine mixer 58.

Figure 8:
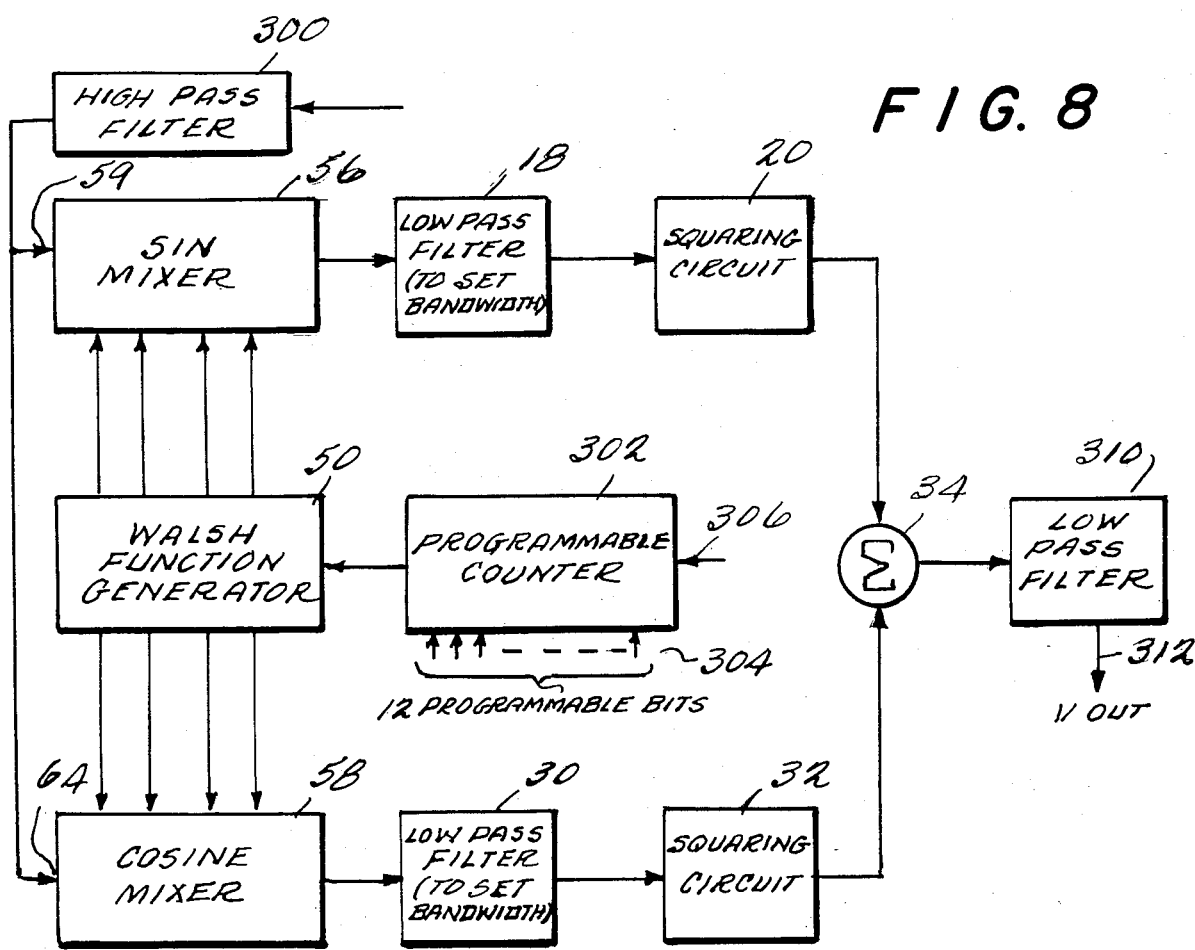
FIG. 8 is a block diagram of the digital tone detector according to the present invention.

Referring now to FIG. 8 there is shown a block diagram of a tone detector incorporating the mixer stage shown in block diagram in FIG. 6 and schematically in FIG. 7. Walsh function generator 50, sine mixer 56 and cosine mixer 58 are represented by the same reference numerals used in FIGS. 6 and 7. An input signal to be tone detected is filtered by a high pass filter 300 before being coupled to input 59 of sine mixer 56 and input 64 of cosine mixer 58. Walsh function generator 50, sine mixer 56 and cosine mixer 58 were described in detail with reference to FIGS. 6 and 7 and therefore will not be further described. The input to Walsh function generator 50 is through a programmable counter 302 having programming inputs 304 for determining the input reference frequency to Walsh function generator 50. A stable reference frequency is applied to an input 306 of programmable counter 302.

The output of sine mixer 56 is coupled through low pass filter 18 (also shown in FIG. 3). The output of low pass filter 18 is coupled through square law device 20. The output of cosine mixer 58 is coupled through low pass filter 30 and squaring circuit 32. The outputs of squaring circuits 20 and 32 are summed by summer 34 and low pass filtered by a low pass filter 310 to provide a tone detector output 312.

While the invention has been described in connection with what is presently considered to be most practical and preferred embodiments, it is to be understood that the invention is not to be limited to the disclosed embodiments, but on the contrary, is intended to cover various modifications and equivalent arrangements included within the spirit and scope of the appended claims which scope is to be afforded the broadest interpretation so as to encompass all such modifications and equivalent structures.

What is claimed:

1. A mixer stage for multiplying an input signal by the sine and cosine of a reference frequency, comprising:
   (a) input means for receiving said input signal;
   (b) a first set of transmission gates, each gate having an input means for receiving said input signal, an output, and a control input for receiving a control signal for causing the gate to pass the input signal from the gate input to its output or block the input signal so that it does not pass to the output;
   (c) first means associated with said first set of transmission gates for combining the signals at the outputs thereof into a first mixer section output providing a signal defined by the input signal multiplied by the sine of the reference frequency;
   (d) first means associated with said first set of transmission gates for weighting the contributions of the signals from each transmission gate to said first combining means;
   (e) a second set of transmission gates, each gate having an input means for receiving said input signal, an output and a control input for receiving a control signal for causing the gate to pass the input signal from the gate input to its output or block the input signal so that it does not pass to the output;
   (f) second means associated with said second set of transmission gates for combining signals at the outputs thereof into a second mixer section output providing a signal defined by the input signal multiplied by the cosine of the reference frequency;
   (g) second means associated with said second set of transmission gates for weighting the contributions of the signals from each transmission gate to said second combining means;
   (h) a reference frequency source;
   (i) Walsh function generating means, having an input coupled to said reference frequency source, for generating a first set of outputs representing a sine wave synthesis of reference frequency from Walsh function pulse trains, said first set of outputs being coupled to said control inputs of said first set of transmission gates, and for generating a second set of outputs representing a cosine synthesis of said reference frequency from Walsh function pulse trains, said second set of outputs being coupled to said control inputs of said second set of transmission gates.

2. A mixer stage according to claim 1 wherein said first weighting means and first combining means together comprise a first summing resistor network, the resistor values determining the weighting of the contributions of each transmisson gate of said first set of transmission gates.

3. A mixer stage according to claim 1 or 2 wherein said second weighting means and said first combining means together comprise a second summing resistor network, the resistor values determining the weighting of the contribution of each transmission gate of said second set of transmission gates.

4. A mixer stage according to claim 1 whererin said transmission gates are CMOS transmission gates.

5. A mixer stage according to claim 1 wherein said Walsh function generating means comprises:
   a ripple counter having a clock input coupled to said reference frequency source and a set of outputs each output representing a different division of the clock input; and
   a logic gate network having inputs coupled to said set of outputs of said ripple counter, a plurality of outputs constituting said first set of outputs of said Walsh function generating means and a plurality of outputs constituting said second set of outputs of said Walsh function generating means.

6. A mixer stage according to claim 5 wherein said ripple counter comprises a 4040 integrated circuit.

7. A mixer stage according to claim 1, 5 or 6 further including a gain controllable stage coupled between said input means and said first and second sets of transmission gates.

8. A mixer stage according to claim 5 or 6 wherein said transmission gates comprise quad bilateral switches.

9. A mixer stage according to claim 8 wherein said quad bilateral switches comprise 4066 integrated circuits.

10. A mixer stage according to claim 1, 5 or 6 further including an amplifier stage coupled to said first combining means.

11. A mixer stage according to claim 1, 5 or 6 further including an amplifier stage coupled to said second combining means.

12. A digital tone detector for determining the presence or absence of a predetermined reference frequency component in an input signal comprising:
   input means for receiving said input signal;
   a first Walsh function mixer having a signal input coupled to said input means, a set of control inputs and an output for providing an output signal defined by said input signal multiplied by the sine of said reference frequency;
   a second Walsh function mixer having a signal input coupled to said input means, a set of control inputs and an output for providing an output signal defined by said input signal multiplied by the cosine of said reference frequency;
   a reference frequency source;
   a Walsh function generator having an input coupled to said reference frequency source for generating, at a first set of outputs, signals representing a sine wave synthesis of said reference frequency, said first set of outputs being coupled to said control inputs of said first Walsh function mixer and for generating, at a second set of outputs, signals representing a cosine wave synthesis of said reference frequency, said second set of outputs being coupled to said control inputs of said second Walsh function mixer;
   a first low pass filter coupled to said output of said Walsh function mixer;
   a first squaring circuit coupled to said first low pass filter;
   a second low pass filter coupled to said output of said second Walsh function mixer;
   a second squaring circuit coupled to said second low pass filter;
   means for combining signals from said first and second squaring circuits to provide an output signal whenever said input signal includes, as a component thereof, said reference frequency.

13. A tone detector according to claim 12 further including third low pass filter for filtering signals from said combining means.

14. A tone detector according to claim 12 wherein said first Walsh function mixer comprises a first set of transmission gates, each gate having an input coupled to said input means for receiving said input signal, an output and a control input for receiving a control signal causing the gate to pass the input signal from the gate input to its output or block the input signals so that it does not pass to the output, the control signals being the signals at said first set of outputs of Walsh function generator.

15. A tone detector according to claim 12 wherein said second Walsh function mixer comprises a second set of transmission gates, each gate having an input coupled to said input means for receiving said input signal, an output and a control input for receiving a control signal causing the gate to pass the input signal from the gate input to its output or block the input signals so that it does not pass to the output, the control signals being the signals at said second set of outputs of said Walsh function generator.

16. A tone detector according to claim 14 or 15 wherein said transmission gates comprise CMOS transmission gates.

17. A tone detector according to claim 14 or 15 wherein said transmission gates comprise quad bilateral switches.

18. A tone detector according to claim 17 wherein said quad bilateral switches comprise a 4066 integrated circuit.

19. A tone detector according to claim 14 wherein said first Walsh function mixer further includes first means associated with said first set of transmission gates for combining the signals at the outputs thereof to form the output of said first Walsh function mixer.

20. A detector according to claim 19 further including first means associated with said first set of transmission gates for weighting the contribution of the signals from each transmission gate to said first combining means.

21. A tone detector according to claim 15 wherein said second Walsh function mixer further includes second means associated with said second set of transmission gates for combining the signals at the output thereof to form the output of said second Walsh function mixer.

22. A tone detector according to claim 21 further including second means associated with said second set of transmission gates for weighting the contribution of the signals from each transmission gate to said second combining means.

23. A tone detector according to claim 20 wherein said first weighting means and said first combining means together comprise a first summing resistor network, the resistor values determining the weighting of the contribution of each transmission gate of said first set of tranmission gates.

24. A tone detector according to claim 22 wherein said second weighting means and said second combining means together comprise a second summing resistor network the resistor values determining the weighting of the contribution of each transmission gate of said second set of transmission gates.

25. A tone detector according to claim 12 wherein said Walsh function generator comprises:
a ripple counter integrated circuit having a clock input coupled to said reference frequency source and a set of outputs, each output representing a different division of the clock input; and
a logic gate network having inputs coupled to said set of outputs of said ripple counter and a plurality of outputs constituting said first set of outputs of said Walsh function generating means and a plurality of outputs constituting said second set of outputs of said Walsh function generating means.

26. A tone detector according to claim 25 wherein said ripple counter integrated circuit comprises a 4040 integrated circuit.

* * * * *